United States Patent
Huynh

(10) Patent No.: US 8,705,667 B1
(45) Date of Patent: Apr. 22, 2014

(54) RAKE RECEIVING IN A QUADRATURE BANDPASS-SAMPLING RECEIVER

(71) Applicant: Phuong Thu-Minh Huynh, Fairfax, VA (US)

(72) Inventor: Phuong Thu-Minh Huynh, Fairfax, VA (US)

(73) Assignee: Phuong Huynh, Fairfax, VA (US)

( * ) Notice: Subject to any disclaimer, the term of this patent is extended or adjusted under 35 U.S.C. 154(b) by 0 days.

(21) Appl. No.: 13/714,543

(22) Filed: Dec. 14, 2012

(51) Int. Cl.
*H04L 27/06* (2006.01)

(52) U.S. Cl.
USPC .......................................... 375/340

(58) Field of Classification Search
CPC ........ H03M 3/43; H03M 3/432; H04L 27/22; H04L 27/38
USPC .......................................... 375/316, 322, 340
See application file for complete search history.

(56) References Cited

U.S. PATENT DOCUMENTS

| | | | | |
|---|---|---|---|---|
| 8,031,810 B1 * | 10/2011 | Hsu et al. | ...................... | 375/316 |
| 2004/0057534 A1 * | 3/2004 | Masenten et al. | ............. | 375/316 |
| 2011/0068966 A1 * | 3/2011 | Daniels et al. | ................ | 341/161 |
| 2012/0127009 A1 * | 5/2012 | Pagnanelli | .................... | 341/143 |

* cited by examiner

*Primary Examiner* — Don N Vo

(57) ABSTRACT

Apparatus and method for rake receiving in a quadrature bandpass-sampling RF receiver is provided. The receiver bandpass-samples and quantizes an RF signal to provide an in-phase bi-level digital signal based on an in-phase clock and a quadrature bi-level digital signal based on a quadrature clock. The in-phase clock frequency and the quadrature clock frequency are equal to the RF signal carrier frequency. The quadrature clock is ninety degree out of phase with respect to the in-phase clock. The delayed bits in both the in-phase digital signal group and the quadrature digital signal group are maximal-ratio combined to provide diversity gain.

12 Claims, 6 Drawing Sheets

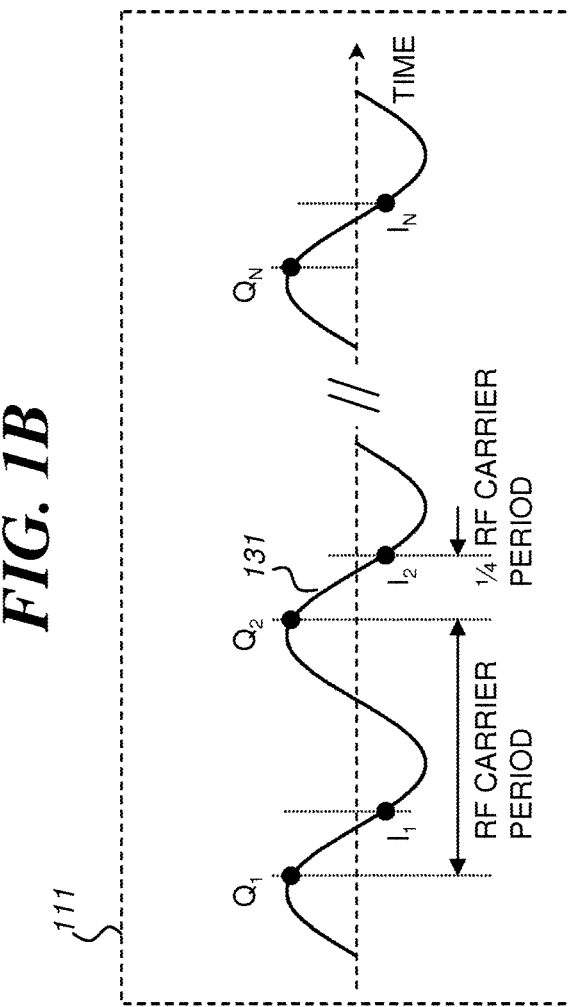

RAKE RECEIVING IN A QUADRATURE BANDPASS-SAMPLING RECEIVER

FIELD OF THE INVENTION

The present invention relates to communication receivers, bandpass-sampling architectures, bandpass delta-sigma modulators, and the usage of multipath diversity to enhance communication links.

BACKGROUND OF THE INVENTION

Advancement in semiconductor process technologies allows usage of the quadrature bandpass-sampling delta-sigma analog-to-digital demodulator (QBS-ADD) at RF frequencies, which is a new promising low-cost and reliable technique to digitize RF signals directly at the antenna. The technology is based on the bandpass sampling technique combined with delta-sigma modulation to demodulate and digitize an RF signal to baseband in a form of high-sampling-rate bit streams. The down-converted in-phase and quadrature output signals are clocked at a high sampling rate, equal to the carrier frequency that modulates the RF signal. The in-phase and quadrature outputs are bi-level digital signals, having a value of 1 or −1.

Because the demodulated in-phase and quadrature digital signals are sampled at a very high clock rate, generally having a period of sub-nanoseconds, it is possible to exploit the multipath diversity as the granularity of the sampling period can resolve different RF signal paths due to reflections at objects and buildings reaching the quadrature bandpass-sampling receiver. Rake receiving technique can be used in conjunction with the in-phase and quadrature digital output signals, sampled at a high-sampling rate, to provide diversity gain. Furthermore, the 1-bit resolution of the in-phase and quadrature digital outputs allows simple arithmetic operations and avoids usage of digital multipliers.

SUMMARY OF THE INVENTION

The invention features a circuit for demodulating an RF signal to baseband comprising: a quadrature bandpass-sampling analog-to-digital demodulator (QBS-ADD), configured to receive an RF signal, having an RF carrier frequency, quantize the RF signal based on the in-phase sampling clock to generate an in-phase digital signal, and quantize the RF signal based on the quadrature sampling clock to generate a quadrature digital signal; a sampling clock generator configured to generate an in-phase sampling clock, having an in-phase sampling clock frequency, and a quadrature sampling clock, having a quadrature sampling clock frequency; a code generator configured to generate first through $P^{th}$ coefficients, each having M bits of accuracy; a rake processor configured to receive first through $P^{th}$ coefficients based on the in-phase digital signal to generate an in-phase rake signal; receive first through $P^{th}$ coefficients based on the quadrature digital signal to generate a quadrature rake signal; wherein both the in-phase sampling clock frequency and the quadrature sampling clock frequency being equal to the RF carrier frequency, the quadrature sampling clock being ninety degree out of phase with respect to the in-phase sampling clock, both the in-phase rake signal and the quadrature rake signal having M bits of accuracy, and both the in-phase digital signal and the quadrature digital signal being bi-level digital signals.

Also, the rake processor further comprises: an in-phase bit processor configured to delay the in-phase digital signal by an $i^{th}$ delay time equal to $d_i \times D$, to generate an $i^{th}$ delayed in-phase signal, with D being a set delay time; first through $P^{th}$ in-phase sign multiplexers, the $i^{th}$ in-phase sign multiplexer being configured to receive the $i^{th}$ coefficient based on the $i^{th}$ delayed in-phase signal to generate an $i^{th}$ in-phase coefficient, having a value equal to the value of the $i^{th}$ delayed in-phase signal multiplied by the value of $i^{th}$ coefficient; an in-phase summer configured to combine all first through $P^{th}$ in-phase coefficients to generate an in-phase rake signal; an quadrature bit processor configured to delay the quadrature digital signal by an $i^{th}$ delay time equal to $d_i \times D$, to generate an $i^{th}$ delayed quadrature signal; first through $P^{th}$ quadrature sign multiplexers, the $i^{th}$ quadrature sign multiplexer being configured to receive the $i^{th}$ coefficient based on the $i^{th}$ delayed quadrature signal to generate an $i^{th}$ quadrature coefficient, having a value equal to the value of $i^{th}$ delayed quadrature signal multiplied by the value of $i^{th}$ coefficient; a quadrature summer configured to combine all first through $P^{th}$ quadrature coefficients to generate a quadrature rake signal; wherein i being an index value that varies from 1 to P, and representing a numeric identifier of one of the first through $P^{th}$ delays, $d_i$, in the in-phase and quadrature bit streams, D being equal to the period of the RF carrier frequency, $d_i$ being a positive integer, $d_i$ being larger than $d_{i-1}$, $d_1$ being equal to zero, and P is a positive integer; wherein $d_P \times D$ is smaller than $D_{MAX}$, with $D_{MAX}$ being equal to 10 usec; wherein P is larger than 1 and smaller than $D_{MAX}$ divided by D, with $D_{MAX}$ being equal to 10 usec; wherein the RF carrier frequency being between 0.5 GHz to 6 GHz; wherein M is larger than 1 and smaller than 64.

The invention also features a method for demodulating an RF signal to baseband comprising: receiving an RF signal, having an RF carrier frequency; quantizing the RF signal based on the in-phase sampling clock to generate an in-phase digital signal, and based on the quadrature sampling clock to generate a quadrature digital signal; generating an in-phase sampling clock, having an in-phase sampling clock frequency; generating a quadrature sampling clock, having a quadrature sampling clock frequency; generating first through $P^{th}$ coefficients, each having M bits of accuracy; receiving first through $P^{th}$ coefficients based on the in-phase digital signal to generate an in-phase rake signal, and based on the quadrature digital signal to generate a quadrature rake signal; wherein both the in-phase sampling clock frequency and the quadrature sampling clock frequency being equal to the RF carrier frequency, the quadrature sampling clock being ninety degree out of phase with respect to the in-phase sampling clock, both the in-phase rake signal and the quadrature rake signal having M bits of accuracy, and both the in-phase digital signal and the quadrature digital signal being bi-level digital signals.

Also, the receiving of first through $P^{th}$ coefficients further comprises: delaying the in-phase digital signal by first through $P^{th}$ delay times to generate first through $P^{th}$ delayed in-phase signals, an $i^{th}$ delay time being equal to $d_i \times D$, with D being a set delay time; delaying the quadrature digital signal by first through $P^{th}$ delay times to generate first through $P^{th}$ delayed quadrature signals, an $i^{th}$ delay time being equal to $d_i \times D$; receiving first through $P^{th}$ coefficients based on first through $P^{th}$ delayed in-phase signals, respectively, to generate first through $P^{th}$ in-phase coefficients, the $i^{th}$ in-phase coefficient having a value equal to the value of $i^{th}$ delayed in-phase signal multiplied by the value of the $i^{th}$ coefficient; receiving first through $P^{th}$ coefficients based on first through $P^{th}$ delayed quadrature signals, respectively, to generate first through $P^{th}$ quadrature coefficients, the $i^{th}$ quadrature coefficient having a value equal to the value of the $i^{th}$ delayed quadrature signal multiplied by the value of the $i^{th}$ coefficient; combining all first through $P^{th}$ in-phase coefficients to generate an in-phase rake signal; combining all first through $P^{th}$ quadrature coefficients to generate a quadrature rake signal; wherein i being an index value that varies from 1 to P, and representing a numeric identifier of one of the first through $P^{th}$ delay, $d_i$, in the in-phase and quadrature bit streams, D being equal to the period of the RF carrier frequency, $d_i$ being a positive integer, $d_i$ being larger than $d_{i-1}$, $d_1$ being equal to zero, and P is a positive integer; wherein $d_P \times D$ is smaller than than $D_{MAX}$, with $D_{MAX}$ being equal to 10 usec; wherein P is larger than 1 and smaller than $D_{MAX}$ divided by D, with $D_{MAX}$ being equal to 10 usec; wherein the RF carrier frequency being between 0.5 GHz to 6 GHz; wherein M is larger than 1 and smaller than 64.

BRIEF DESCRIPTION OF THE DRAWINGS

The accompanying figures where like reference numerals refer to identical or functionally similar elements and which together with the detailed description below are incorporated in and form part of the specification, serve to further illustrate an exemplary embodiment and to explain various principles and advantages in accordance with the present invention.

FIG. 1B is a timing diagram illustrating quadrature down conversion to baseband based on the bandpass-sampling theory;

DETAILED DESCRIPTION

In overview, the present disclosure concerns electronic devices or units, some of which are referred to as communication units, such as cellular phone or two-way radios and the like, typically having a capability for rapidly handling data, such as can be associated with a communication system such as an Enterprise Network, a cellular Radio Access Network, or the like. More particularly, various inventive concepts and principles are embodied in circuits, and methods therein for receiving signals in connection with a communication unit.

The instant disclosure is provided to further explain in an enabling fashion the best modes of performing one or more embodiments of the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms such as first and second, and the like, if any, are used solely to distinguish one from another entity, item, or action without necessarily requiring or implying any actual such relationship or order between such entities, items or actions. It is noted that some embodiments may include a plurality of processes or steps, which can be performed in any order, unless expressly and necessarily limited to a particular order; i.e., processes or steps that are not so limited may be performed in any order.

Much of the inventive functionality and many of the inventive principles when implemented, are best supported with in integrated circuits (ICs), such as a digital signal processor or application specific ICs. It is expected that one of ordinary skill, notwithstanding possibly significant effort and many design choices motivated by, for example, available time, current technology, and economic considerations, when guided by the concepts and principles disclosed herein will be readily capable of generating ICs with minimal experimentation. Therefore, in the interest of brevity and minimization of any risk of obscuring the principles and concepts according to the present invention, further discussion of such ICs, if any, will be limited to the essentials with respect to the principles and concepts used by the exemplary embodiments.

Figure 1A:
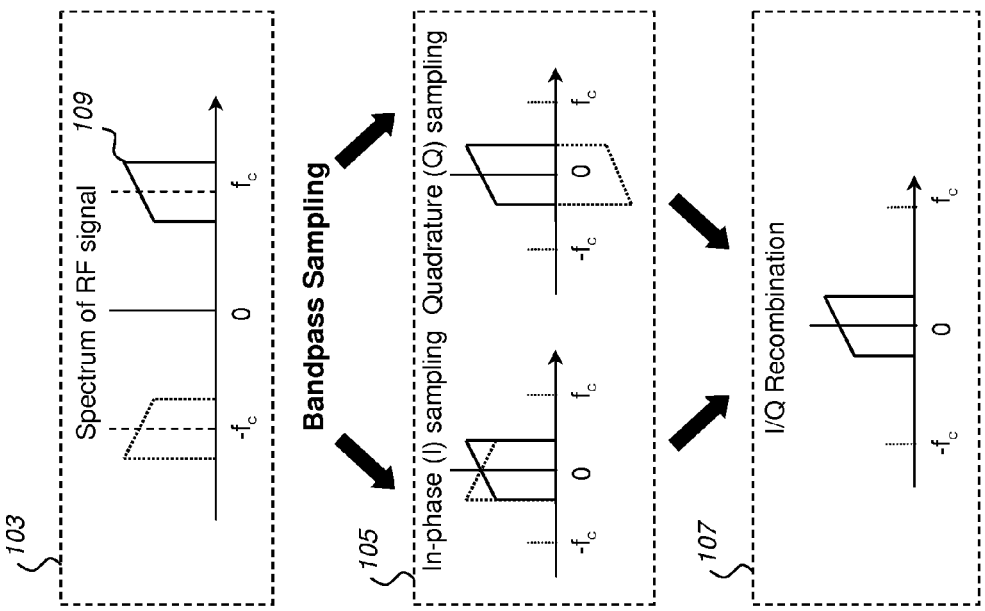
FIG. 1A is a frequency diagram illustrating quadrature down conversion to baseband based on the bandpass-sampling theory.

Referring now to FIG. 1A, frequency diagrams 103, 105, and 107 illustrate quadrature down conversion of an RF signal to the baseband frequency based on the bandpass-sampling theory. A communication transmitter is employed to modulate the information to a carrier frequency, $f_C$, and transmit the RF signal over the air. For example, conventional cellular phone carrier frequencies are currently set at either 900 MHz or 1800 MHz. In quadrature modulation, two independent data streams, A(t) and B(t), are modulated by $\cos(w_C t)$ and $\sin(w_C t)$, respectively, where $w_C = 2\pi f_C$. The combined A(t) $\cos(w_C t) - B(t) \sin(w_C t)$ is then transmitted over the air. In the frequency domain, the transmitted information 109 in the frequency diagram 103 can be seen centered at the carrier frequency, $f_C$, where the width of the shaped object corresponds to the bandwidth of the transmitted information. Note that the transmitted object is mirrored to the negative frequencies along the zero-frequency axis.

Referring now to FIG. 1B, the timing diagram 111 illustrating a sinusoidal waveform 131 at the RF carrier frequency is provided. The in-phase, A(t), and quadrature, B(t) signals which carry the communicating information modulate slowly the amplitude and/or the phase of the sinusoidal waveform 131, depending on the modulation scheme employed in the communication system. In a quadrature bandpass-sampling receiver, the sampling rate is set equal to the RF carrier frequency, $f_C$, and only two respective sampled data points for every period of the RF carrier are captured, as shown in the timing diagram 111. The first sequence of sampled data points $I_1, I_2, \ldots, I_N$ corresponds to the in-phase (I) sequence while the second sequence of sampled data points $Q_1, Q_2, \ldots, Q_N$ corresponds to the quadrature (Q) sequence. Note that the time duration in between two adjacent sampled points of each sequence is always, $$\frac{1}{f_C},$$

the RF carrier period, and the time duration between a Q sampled point and an adjacent I sampled point is always, $$\frac{1}{4f_C},$$

or one quarter of the RF carrier period.

Bandpass sampling the sinusoidal waveform 131 removes the high frequency RF waveform and captures only the slowly-varying amplitude and/or phase of the communicating information that were modulated to the RF carrier frequency. By virtue of the bandpass sampling theory, the in-phase and quadrature modulated signals are down-converted to baseband, or dc, as illustrated in the frequency diagram 105 of FIG. 1A. The sampled I and Q sequences can be recombined, according to I±jQ (where j denotes the imaginary complex number notation), to re-construct the transmitted A(t) and B(t) signals as in the frequency diagram 107.

Figure 2A:
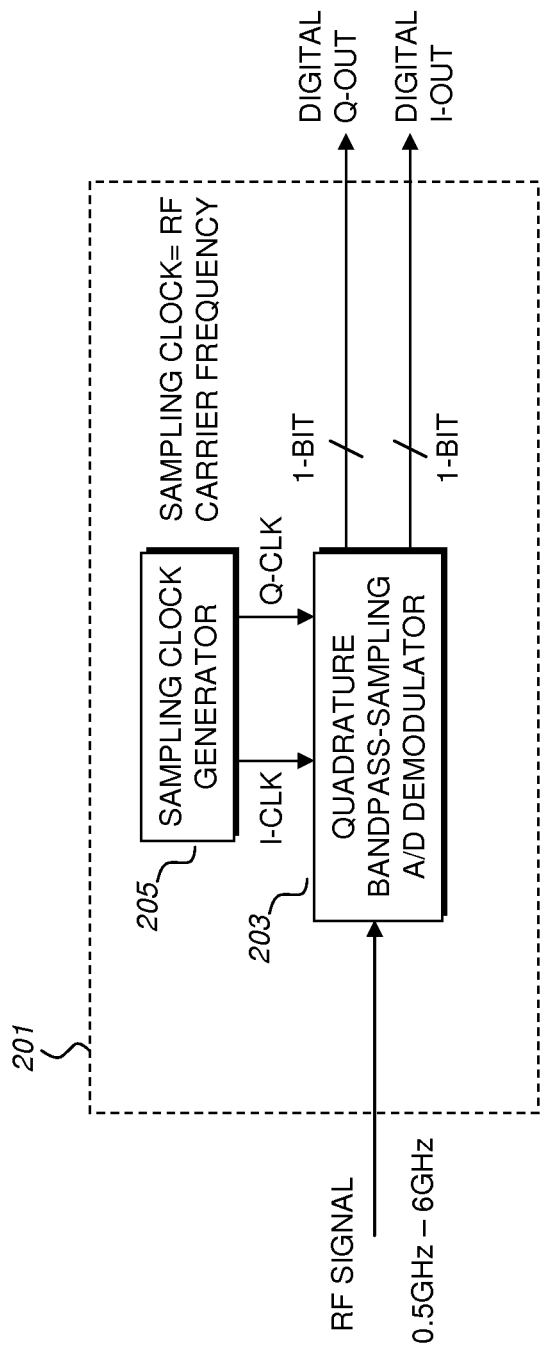
FIG. 2A is a schematic diagram illustrating a conventional quadrature bandpass sampling receiver.

Referring now to FIG. 2A, a schematic diagram illustrating a conventional quadrature bandpass sampling receiver 201 is discussed. The quadrature bandpass sampling receiver 201 comprises a sampling clock generator 205, and a quadrature bandpass-sampling analog-to-digital demodulator (QBS-ADD) 203. The sampling clock generator 205 generates an in-phase sampling clock (I-CLK) and a quadrature sampling clock (Q-CLK). The in-phase sampling clock frequency and the quadrature sampling clock frequency are set equal to the carrier frequency, $f_C$, of the input RF signal. The quadrature sampling clock Q-CLK is 90-degree out-of-phase with respect to the in-phase sampling clock I-CLK. The RF signal, whose center frequency is located between 0.5 GHz and 6 GHz, is bandpass-sampled and demodulated by the QBS-ADD 203 based on I-CLK to produce a digital I-OUT signal, and based on Q-CLK to produce a digital Q-OUT signal.

Both digital I-OUT and Q-OUT signals are bi-level signals, having only one bit of resolution. However, because the I-OUT and Q-OUT signals are clocked at a sampling rate equal to the RF signal carrier frequency, and the transmitted baseband signals A(t) and B(t) have bandwidths of only a few or tens of megahertz, it is possible to use the oversampling technique to noise-shape the quantization noise in the I-OUT and Q-OUT signals. This oversampling technique is often used in delta-sigma modulators, in which the quantization noise is pushed out to the high frequency range, leaving the signal band near dc having very low level of quantization noise.

Figure 2B:
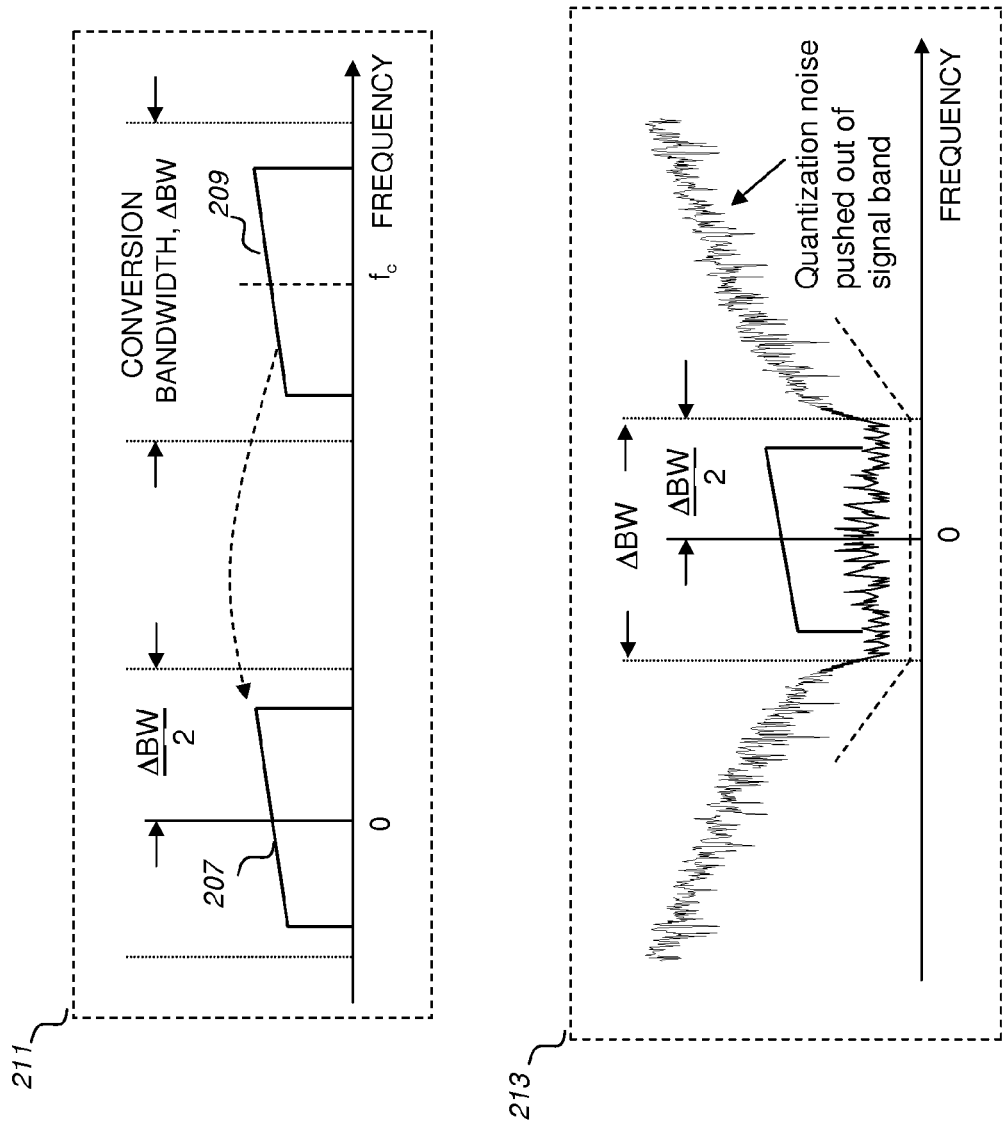
FIG. 2B is a frequency diagram illustrating RF signal demodulation and quantization noise-shaping based on the conventional quadrature bandpass sampling receiver.

In FIG. 2B, the frequency diagrams 211 and 213 illustrate the down-conversion of the RF signal and the spectrum profile of the QBS-ADD 203 outputs, after I/Q recombination. In the frequency diagram 211, the concepts of input conversion bandwidth of the QBS-ADD 203 is illustrated. The input conversion bandwidth, ΔBW, is defined as the frequency range within which an RF signal can be demodulated to baseband and effectively quantized to yield the high-resolution in-phase and quadrature baseband signals. The input RF signal 209 is centered at the RF carrier frequency, $f_C$ (note that the negative frequency component is not shown in the frequency diagram 401 for clarity purpose). The center frequency of ΔBW is also equal to $f_C$. Therefore, for the RF signal 209 to be effectively quantized and demodulated, its total bandwidth, defined as the frequency width of the input RF signal 209, must be smaller than ΔBW. After down conversion to baseband, the complex (I−jQ) recombination of the in-phase (I) component I-OUT and the quadrature (Q) component Q-OUT produces the baseband signal 207. In general, ΔBW is usually set between 5 MHz to 100 MHz.

Unlike other conventional RF receivers where the in-phase and quadrature demodulated signals are digitized by a pair of high-resolution A/Ds at a low sampling rate, the QBS-ADD 203 is a delta-sigma type converter, which produces a stream of bi-level digital I-OUT and Q-OUT signals clocked at a sample rate equal to the RF signal carrier frequency. The frequency diagram 213 illustrates a typical spectrum profile of the combined I−jQ (where j is the imaginary complex number) from the I-OUT and Q-OUT signals. Even though I-OUT and Q-OUT exhibit noise-like characteristics, the noise-shaping property of oversampling delta-sigma modulators pushes the quantization noise to higher frequencies and leaves the signal band at baseband, between $$-\frac{\Delta BW}{2} \text{ and } \frac{\Delta BW}{2},$$

with a minimum amount of quantization noise. It is seen then that the frequency band from $$-\frac{\Delta BW}{2} \text{ to } \frac{\Delta BW}{2},$$

within which the quantization noise is minimized, defines the input conversion bandwidth of the QBS-ADD 203; i.e. if the RF signal band falls within the input conversion bandwidth of the QBS-ADD 203, then the RF signal can be demodulated and effectively quantized to the highest resolution.

Because of the high-sampling rate of the demodulated in-phase and quadrature digital signals (generally having a period of sub-nanoseconds), it is possible to exploit the multipath diversity as the granularity of the sampling period can resolve different RF signal paths due to reflections at objects and buildings reaching the quadrature bandpass-sampling receiver 201. Rake receiving technique can be used in conjunction with the in-phase and quadrature digital output signals, sampled at a very high-sampling rate, to provide diversity gain. Furthermore, the 1-bit resolution of the in-phase and quadrature digital outputs allows simple arithmetic operations and avoids usage of digital multipliers.

Figure 3:
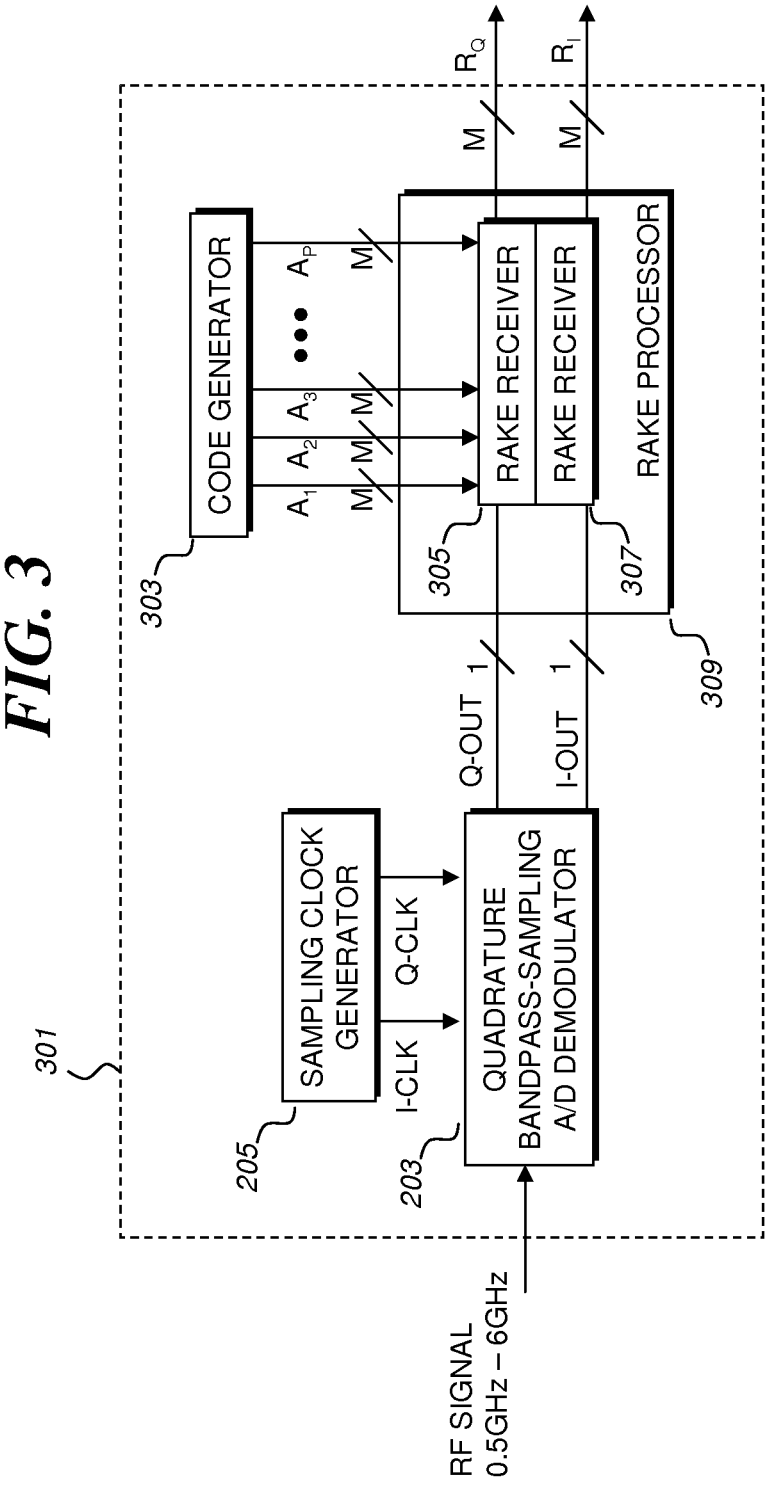
FIG. 3 is a schematic diagram illustrating an exemplary quadrature bandpass sampling rake receiver, according to disclosed embodiments.

Referring now to FIG. 3, a schematic diagram illustrating an exemplary quadrature bandpass-sampling rake receiver 301 will be described and discussed. The quadrature bandpass-sampling rake receiver 301 comprises a sampling clock generator 205, a QBS-ADD 203, a code generator 303, and a rake processor 309, which comprises two identical rake receivers: an in-phase rake receiver 307 and a quadrature rake receiver 305. The code generator 303 generates a set of first through $P^{th}$ coefficients, $A_1, A_2, A_3, \ldots,$ and $A_P$, where P is a positive integer. These coefficients are constants having M bits of accuracy. Usually, these coefficients are generated within a digital signal processing (DSP) processor in a fixed-point format having an accuracy, which can vary from as low as 2 bits to as high as 64 bits depending on the precision of the application. The quadrature rake receiver 305 captures the bit stream Q-OUT and employs the P coefficients to generate a quadrature rake signal, $R_Q$, having M bits of accuracy. Likewise, the in-phase rake receiver 307 captures the bit stream I-OUT and employs the P coefficients to generate an in-phase rake signal, $R_I$, having also M bits of accuracy.

Figure 4:
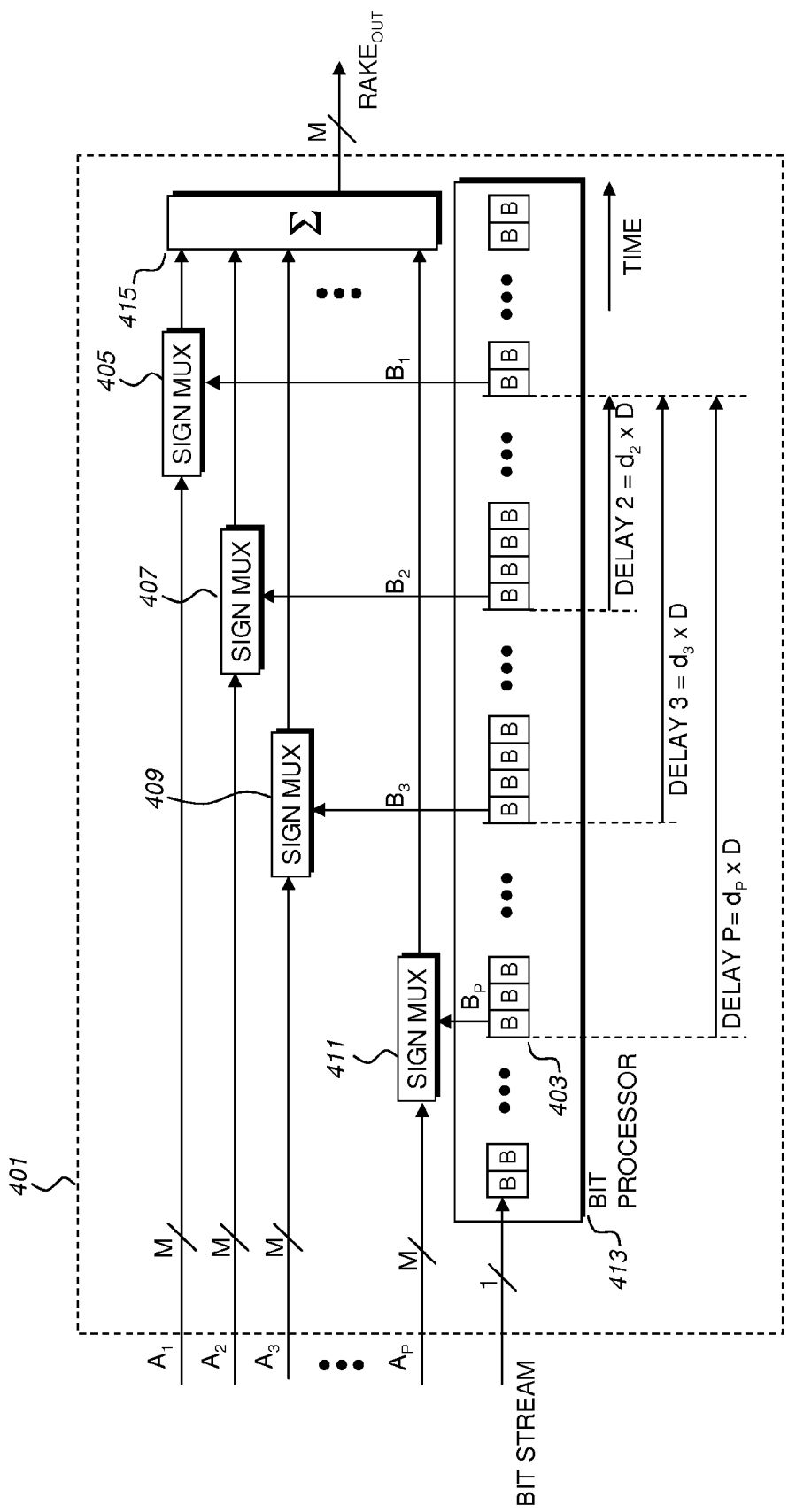
FIG. 4 is a schematic diagram illustrating an exemplary multipath combining in a rake receiver, according to disclosed embodiments.

Referring now to FIG. 4, a schematic diagram illustrating an exemplary multipath combining in a rake receiver 401 will be described and discussed. The rake receiver 401 is a schematic diagram that represents both the in-phase rake receiver 307 and the quadrature rake receiver 305 in FIG. 3, and comprises a bit processor 413, a summer 415, and first through $P^{th}$ sign multiplexers, including a first sign multiplexer 405, a second sign multiplexer 407, a third sign multiplexer 409, and a $P^{th}$ sign multiplexer 411. In the bit processor 413, the bit element B 403 denotes a single bit that has a value of either 1 or −1, and represents a Q-OUT bit feeding the quadrature rake receiver 305 or an I-OUT bit feeding the in-phase rake receiver 307. The bit stream is fed to the bit processor 413, with the first bit $B_1$ exiting the bit processor to the right, and other subsequent bits are delayed with respect to the first bit $B_1$.

The bit processor provides P tap points, which correspond to P bits delayed in time. If D denotes a single bit delay, which is equal to the bit period, or $$\frac{1}{f_C},$$

then the first bit $B_1$ has a delay of $d_1 \times D$, with $d_1 = 0$ (no delay). The second bit has a delay $d_2 \times D$ with respect to the first bit; the third bit $B_3$ has a delay $d_3 \times D$ with respect to the first bit; and the $P^{th}$ bit $B_P$ has a delay $d_P \times D$ with respect to the first bit; where the set $\{d_1, d_2, d_3, \ldots, d_P\}$ are positive integers, with $d_1 = 0$ and $d_i > d_{i-1}$ for i from 2 to P. Each entry in the set represents a multiple of the bit delay D of the corresponding bit with respect to the first bit $B_1$ position in time.

By virtue of the time diversity technique, the quadrature bandpass-sampling rake receiver 301 can provide diversity gain by maximal-ratio combining the P bits, $B_1, B_2, B_3, \ldots, B_P$ and generating the $RAKE_{OUT}$ signal according to:

$$RAKE_{OUT} = \sum_{i=1}^{P} A_i \times B_i, \quad (1)$$

where $B_i$ denotes a bit value in the set $\{1, -1\}$ of the $i^{th}$ tap point, $A_i$ is one of the coefficients generated by the code generator 303 in FIG. 3. The coefficients $A_{1 \ldots P}$ are assumed to be calculated from the optimization theory such that the signal-to-noise ratio (SNR) of the output signal $RAKE_{OUT}$ is enhanced. Equation (1) above shows that $RAKE_{OUT}$ is a weighted sum of the individual bits $B_1, B_2, \ldots, B_P$, wherein each bit has either a value of 1 or $-1$. Therefore, it is seen that no multiplication is required; and the sign of each coefficient $A_i$ is evaluated based on the corresponding bit value, $B_i$, before the summation is carried out in the summer 415. The sign multiplexers 405, 407, 409, and 411 provide a mean of evaluating $A_i \times B_i$ in the equation (1) above via evaluation of the sign of $B_i$ instead of usage of the multiplication operator. If $B_i$ is equal to 1, then the coefficient $A_i$ is fed through the $i^{th}$ sign multiplexer. On the other hand, if $B_i$ has a value of $-1$, then the sign of the coefficient $A_i$ is inverted and output by the $i^{th}$ sign multiplexer.

Since the digital outputs Q-OUT and I-OUT are generated at the in-phase and quadrature sampling rate, which is equal to the carrier frequency of the input RF signal, the bit period can be on the order of sub-nanoseconds to a couple of nanoseconds. On the other hand, the excess delay, which is defined as the relative delay of a multipath component of the input RF signal as compared to the first arriving component, is typically on the order of microseconds in outdoor mobile radio channels and on the order of nanoseconds in indoor radio channels. Assuming that the maximum excess delay, $D_{MAX}$, is 10 usec, and that D denotes the bit period $$\left(D = \frac{1}{f_C}\right), \text{ then } \frac{D_{max}}{D}$$

can be a very large number. For example, if the carrier frequency of the RF signal is 1 GHz, then $$\frac{D_{max}}{D} = 10,000.$$

Theoretically, the number of tap points, P, provided by the bit processor 413 could be up to $$\frac{D_{max}}{D},$$

if every single bit in the bit processor is used in the equation (1) above. However, multipath due to RF signal reflection against objects and buildings results in about a few or tens of multipath components, and the same number of tap points, P, corresponding to the number of reflected RF signal paths should be used. Also, it is expected that each entry in the set $\{d_1, d_2, d_3, \ldots, d_P\}$, which represents the delay (in multiple of the bit delay D) with respect to the first bit, $B_1$, can not have a delay $d_i \times D$ larger than $D_{MAX}$. As $d_i$ must be larger than $d_{i-1}$ according to FIG. 4, it is required then that $d_P \times D$ can not be larger than $D_{MAX}$.

It should be noted that the term communication unit may be used herein to denote a wired device, for example a high speed modem, an xDSL type modem, a fiber optic transmission device, and the like, and a wireless device, and typically a wireless device that may be used with a public network, for example in accordance with a service agreement, or within a private network such as an enterprise network or an ad hoc network. Examples of such communication devices include a cellular handset or device, television apparatus, personal digital assistants, personal assignment pads, and personal computers equipped for wireless operation, and the like, or equivalents thereof, provided such devices are arranged and constructed for operation in connection with wired or wireless communication.

The communication units of particular interest are those providing or facilitating voice communications services or data or messaging services normally referred to as ultra wideband networks, cellular wide area networks (WANs), such as conventional two way systems and devices, various cellular phone systems including analog and digital cellular, CDMA (code division multiple access) and variants thereof, GSM (Global System for Mobile Communications), GPRS (General Packet Radio System), 2.5G and 3G systems such as UMTS (Universal Mobile Telecommunication Service) systems, Internet Protocol (IP) Wireless Wide Area Networks like 802.16, 802.20 or Flarion, integrated digital enhanced networks, LTE (Long Term Evolution) networks, and variants or evolutions thereof.

Furthermore, the wireless communication devices of interest may have short range wireless communications capability normally referred to as WLAN (wireless local area network) capabilities, such as IEEE 802.11, Bluetooth, WPAN (wireless personal area network) or Hyper-Lan and the like using, for example, CDMA, frequency hopping, OFDM (orthogonal frequency division multiplexing) or TDMA (Time Division Multiple Access) access technologies and one or more of various networking protocols, such as TCP/IP (Transmission Control Protocol/Internet Protocol), UDP/UP (Universal Datagram Protocol/Universal Protocol), IPX/SPX (Inter-Packet Exchange/Sequential Packet Exchange), Net BIOS (Network Basic Input Output System) or other protocol structures. Alternatively the wireless communication devices of interest may be connected to a LAN using protocols such as TCP/IP, UDP/UP, IPX/SPX, or Net BIOS via a hardwired interface such as a cable and/or a connector.

This disclosure is intended to explain how to fashion and use various embodiments in accordance with the invention rather than to limit the true, intended, and fair scope and spirit thereof. The invention is defined solely by the appended claims, as they may be amended during the pendency of this application for patent, and all equivalents thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A circuit for demodulating an RF signal to baseband comprising:
   a sampling clock generator configured to generate
      an in-phase sampling clock, having an in-phase sampling clock frequency, and
      a quadrature sampling clock, having a quadrature sampling clock frequency;
   a quadrature bandpass-sampling analog-to-digital demodulator (QBS-ADD), configured to
      receive an RF signal, having an RF carrier frequency,
      quantize the RF signal based on the in-phase sampling clock to generate an in-phase digital signal, and
      quantize the RF signal based on the quadrature sampling clock to generate a quadrature digital signal;
   a code generator configured to generate first through $P^{th}$ coefficients, each having M bits of accuracy;
   a rake processor configured to
      receive first through $P^{th}$ coefficients based on the in-phase digital signal to generate an in-phase rake signal;
      receive first through $P^{th}$ coefficients based on the quadrature digital signal to generate a quadrature rake signal;
   wherein
      both the in-phase sampling clock frequency and the quadrature sampling clock frequency being equal to the RF carrier frequency,
      the quadrature sampling clock being ninety degree out of phase with respect to the in-phase sampling clock,
      both the in-phase rake signal and the quadrature rake signal having M bits of accuracy,
      both the in-phase digital signal and the quadrature digital signal being bi-level digital signals,
      P is a positive integer, and
      M is a positive integer.

2. The circuit of claim 1, wherein the rake processor further comprises:
   an in-phase bit processor configured to delay the in-phase digital signal by an $i^{th}$ delay time equal to $d_i \times D$, to generate an $i^{th}$ delayed in-phase signal, with D being a set delay time;
   first through $P^{th}$ in-phase sign multiplexers, the $i^{th}$ in-phase sign multiplexer being configured to receive the $i^{th}$ coefficient based on the $i^{th}$ delayed in-phase signal to generate an $i^{th}$ in-phase coefficient, having a value equal to the value of the $i^{th}$ delayed in-phase signal multiplied by the value of $i^{th}$ coefficient;
   an in-phase summer configured to combine all first through $P^{th}$ in-phase coefficients to generate an in-phase rake signal;
   an quadrature bit processor configured to delay the quadrature digital signal by an $i^{th}$ delay time equal to $d_i \times D$, to generate an $i^{th}$ delayed quadrature signal;
   first through $P^{th}$ quadrature sign multiplexers, the $i^{th}$ quadrature sign multiplexer being configured to receive the $i^{th}$ coefficient based on the $i^{th}$ delayed quadrature signal to generate an $i^{th}$ quadrature coefficient, having a value equal to the value of $i^{th}$ delayed quadrature signal multiplied by the value of $i^{th}$ coefficient;
   a quadrature summer configured to combine all first through $P^{th}$ quadrature coefficients to generate a quadrature rake signal;
   wherein
      being an index value that varies from 1 to P, and representing a numeric identifier of one of the first through $P^{th}$ delays, $d_i$, in the in-phase and quadrature bit streams,
      D being equal to the period of the RF carrier frequency,
      $d_i$ being a positive integer,
      $d_i$ being larger than $d_{i-1}$,
      $d_1$ being equal to zero, and
      P is a positive integer.

3. The circuit of claim 2, wherein $d_P \times D$ is smaller than $D_{MAX}$, with $D_{MAX}$ being equal to 10 usec.

4. The circuit of claim 2, wherein P is larger than 1 and smaller than $D_{MAX}$ divided by D, with $D_{MAX}$ being equal to 10 usec.

5. The circuit of claim 1, wherein the RF carrier frequency being between 0.5 GHz to 6 GHz.

6. The circuit of claim 1, wherein M is larger than 1 and smaller than 64.

7. A method for demodulating an RF signal to baseband comprising:
   receiving an RF signal, having an RF carrier frequency;
   generating an in-phase sampling clock, having an in-phase sampling clock frequency;
   generating a quadrature sampling clock, having a quadrature sampling clock frequency;
   quantizing the RF signal
      based on the in-phase sampling clock to generate an in-phase digital signal, and
      based on the quadrature sampling clock to generate a quadrature digital signal;
   generating first through $P^{th}$ coefficients, each having M bits of accuracy;
   receiving first through $P^{th}$ coefficients
      based on the in-phase digital signal to generate an in-phase rake signal, and
      based on the quadrature digital signal to generate a quadrature rake signal;
   wherein
      both the in-phase sampling clock frequency and the quadrature sampling clock frequency being equal to the RF carrier frequency,
      the quadrature sampling clock being ninety degree out of phase with respect to the in-phase sampling clock,
      both the in-phase rake signal and the quadrature rake signal having M bits of accuracy,
      both the in-phase digital signal and the quadrature digital signal being bi-level digital signals, P is a positive integer, and M is a positive integer.

8. A method of claim 7, wherein the receiving of first through $P^{th}$ coefficients further comprises:

delaying the in-phase digital signal by first through $P^{th}$ delay times to generate first through $P^{th}$ delayed in-phase signals, an $i^{th}$ delay time being equal to $d_i \times D$, with D being a set delay time;

delaying the quadrature digital signal by first through $P^{th}$ delay times to generate first through $P^{th}$ delayed quadrature signals, an $i^{th}$ delay time being equal to $d_i \times D$;

receiving first through $P^{th}$ coefficients based on first through $P^{th}$ delayed in-phase signals, respectively, to generate first through $P^{th}$ in-phase coefficients, the $i^{th}$ in-phase coefficient having a value equal to the value of $i^{th}$ delayed in-phase signal multiplied by the value of the $i^{th}$ coefficient;

receiving first through $P^{th}$ coefficients based on first through $P^{th}$ delayed quadrature signals, respectively, to generate first through $P^{th}$ quadrature coefficients, the $i^{th}$ quadrature coefficient having a value equal to the value of the $i^{th}$ delayed quadrature signal multiplied by the value of the $i^{th}$ coefficient;

combining all first through $P^{th}$ in-phase coefficients to generate an in-phase rake signal;

combining all first through $P^{th}$ quadrature coefficients to generate a quadrature rake signal;

wherein i being an index value that varies from 1 to P, and representing a numeric identifier of one of the first through $P^{th}$ delay, $d_i$, in the in-phase and quadrature bit streams, D being equal to the period of the RF carrier frequency, $d_i$ being a positive integer, $d_i$ being larger than $d_{i-1}$, $d_1$ being equal to zero, and P is a positive integer.

9. A method of claim 8, wherein $d_P \times D$ is smaller than than $D_{MAX}$, with $D_{MAX}$ being equal to 10 usec.

10. A method of claim 8, wherein P is larger than 1 and smaller than $D_{MAX}$ divided by D, with $D_{MAX}$ being equal to 10 usec.

11. A method of claim 7, wherein the RF carrier frequency being between 0.5 GHz to 6 GHz.

12. A method of claim 7, wherein M is larger than 1 and smaller than 64.

* * * * *